P. W. SIEURIN.
WINCH.
APPLICATION FILED OCT. 15, 1908.
983,845.
Patented Feb. 7, 1911.
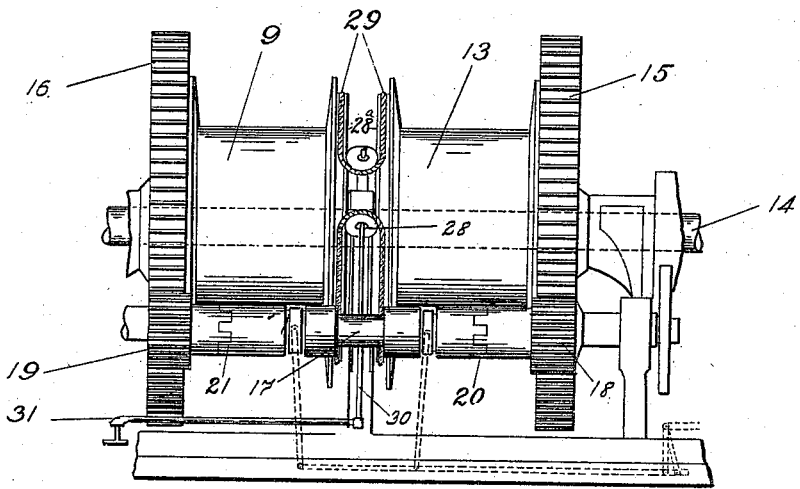
Fig. 1.
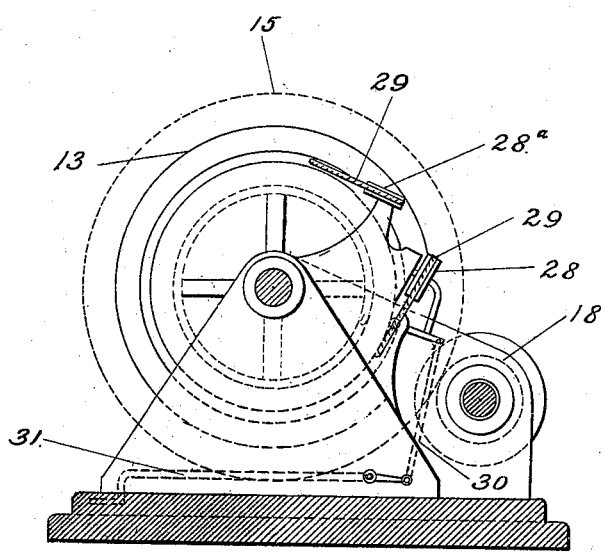
Fig. II.
Witnesses
Inventor
Paul Wilhelm Sieurin.
by B. Singer,
Attorney

UNITED STATES PATENT OFFICE.

PAUL WILHELM SIEURIN, OF GOTTENBORG, SWEDEN.

WINCH.

983,845.     Specification of Letters Patent.     Patented Feb. 7, 1911.

Original application filed April 27, 1908, Serial No. 429,577. Divided and this application filed October 15, 1908. Serial No. 457,876.

*To all whom it may concern:*

Be it known that I, PAUL WILHELM SIEURIN, a subject of the King of Sweden, and resident of Gottenborg, Sweden, have invented a certain new and useful Improvement in Winches, of which the following is a specification.

This invention relates to winches of the kind having two drums rotatable relatively to each other and each provided with a toothed gear which meshes with another toothed gear, said last mentioned gears being each adapted to be coupled and uncoupled with a driving shaft by a clutch.

In the specification of my application No. 429,577, dated April 27, 1908, of which this is a division, there is described an arrangement of winch of this kind in which a movable frictional bevel gear or the like adaptable to drive the one drum from the other in the reverse direction when in engagement therewith is connected to the clutches so as to be kept out of engagement with the drums when both clutches are engaged but to be brought into engagement with the drums when either of said clutches is engaged.

Now, this invention relates to an improved movable frictional device and means for moving it into and out of engagement with the drums independently of the clutches. According thereto the movable frictional device is preferably in the form of an endless rope, chain or the like running around pulleys which are relatively movable and also around the drums, usually in grooves near the adjacent ends; and the frictional device employed is actuated by means of a lever or treadle connected therewith.

Referring to the drawings Figure 1 is a side view and Fig. 2 a sectional view and elevation showing so much of the winch as is necessary to illustrate the invention.

As shown, 9 and 13 are the drums, one 9, of which is fixed and the other 13 is loosely mounted on the same shaft 14. Both drums may, however, be loosely mounted on said shaft or mounted on separate shafts, if desired. Around each drum is coiled a rope or the like, the ropes being coiled in opposite directions and having their free ends connected to a common hook to which the load is attached. The ropes are not shown in the drawings. The drum 13 is provided with a toothed gear 15 and the drum 9 with a toothed gear 16. These toothed gears 15 and 16 respectively mesh with toothed gears 18 and 19 loosely mounted upon a driving shaft 17, clutches 20 and 21 being provided for coupling the gears 18 and 19 respectively to the said shaft.

28 28ª are two pulleys or the like around which and the drums runs an endless rope or chain 29 or the like hereinafter referred to as a rope one of which pulleys 28 can be swung toward and away from the other 28ª, which is mounted on a fixed axis, in order to make it possible to tighten the rope 29 so that one drum is driven by the other and to slacken the rope 29 so that the drums are disengaged from each other. The movable pulley 28 is shown mounted on an arm 30 on a lever 30ª which is connected to a lever or treadle 31. The arrangement is such that, if the lever or treadle is pressed down the movable pulley is swung so as to tighten the rope or chain 29 by which means the drums are put in driving connection so that one is driven from the other in the opposite direction. When the lever or treadle is disengaged, the rope is slackened and the drums put out of driving connection the one with the other.

It is to be understood that it is not intended to include as of this invention any arrangement in which the reversing device between a pair of drums consists of a wheel provided with means for holding it against rotation or permitting it to rotate and carrying toothed pinions which are intermediate of and in permanent engagement with gear wheels on the respective drums thus constituting a reversing epicyclic driving device. Such an arrangement is not only expensive and noisy but some part or parts is or are always in rotation (*i. e.* either the pinions rotate or the wheel carrying them rotates) whereas in a winch according to the present invention when one drum is not being driven from the other no part of the reversing mechanism is running. The frictional reversing device of the present invention is essentially one which can be actually moved into and out of engagement with the drums at will and not merely held against revolution about the axis of the drums at one time and permitted to revolve at another.

What I claim is:—

1. A winch comprising two drums rotatable relatively to each other, a common driving shaft, gears between each of said drums and said shaft, independently operable clutches for putting each of said drums in and out of gear with said shaft, two pulleys, an endless rope passing around said pulleys and said drums and lever actuated means for causing said rope to grip and release said drums.

2. A winch comprising two drums rotatable relatively to each other, a common driving shaft, gears between each of said drums and said shaft, clutches for putting each of said drums in and out of gear with said shaft, two pulleys, an endless rope passing around said pulleys and said drums, an operating lever and connected thereto positively acting means for causing said rope to grip and release said drums.

3. A winch comprising two drums rotatable relatively to each other, a common driving shaft, gears between each of said drums and said shaft, independently operable clutches for putting each of said drums in and out of gear with said shaft, two pulleys movable in relation to each other, an endless rope passing around said pulleys and said drums, and lever actuated means for moving said pulleys relatively and thereby tightening or slackening the rope upon the drums.

4. A winch comprising two drums rotatable relatively to each other, a common driving shaft, gears between each of said drums and said shaft, clutches for putting each of said drums in and out of gear with said shaft, two pulleys movable in relation to each other, an endless rope passing around said pulleys and said drums, an operating lever and connections between said lever and one of said pulleys and adapted to positively move said pulley and thereby tighten or slacken the rope upon the drums.

In testimony whereof I affix my signature in presence of two witnesses.

PAUL WILHELM SIEURIN.

Witnesses:
HJALMAR ZETTERSTRÖM,
FRITZ ESLALLIN.